(12) United States Patent
Huff

(10) Patent No.: US 7,426,560 B2
(45) Date of Patent: Sep. 16, 2008

(54) METHOD AND SYSTEM FOR MANAGING QUALITY OF SERVICE IN A NETWORK

(75) Inventor: Robert L. Huff, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 581 days.

(21) Appl. No.: 10/180,511

(22) Filed: Jun. 27, 2002

(65) Prior Publication Data

US 2004/0003080 A1 Jan. 1, 2004

(51) Int. Cl.
G06F 15/173 (2006.01)
G06F 12/00 (2006.01)

(52) U.S. Cl. ............ 709/226; 709/223; 710/244

(58) Field of Classification Search ......... 709/225–226, 709/229, 220–221, 223; 710/40, 107, 116, 710/123, 244, 301–320
See application file for complete search history.

(56) References Cited

U.S. PATENT DOCUMENTS

| | | | |
|---|---|---|---|
| 6,816,903 B1* | 11/2004 | Rakoshitz et al. ........... 709/226 |
| 6,816,907 B1* | 11/2004 | Mei et al. ................... 709/229 |
| 2001/0052016 A1* | 12/2001 | Skene et al. ................ 709/226 |
| 2002/0049841 A1* | 4/2002 | Johnson et al. ............. 709/225 |
| 2002/0133593 A1* | 9/2002 | Johnson et al. ............. 709/226 |
| 2002/0152305 A1* | 10/2002 | Jackson et al. ............. 709/224 |
| 2002/0174227 A1* | 11/2002 | Hartsell et al. ............. 709/226 |

* cited by examiner

Primary Examiner—William C. Vaughn, Jr.
Assistant Examiner—Peling A Shaw
(74) Attorney, Agent, or Firm—Grossman, Tucker, Perreault & Pfleger, PLLC

(57) ABSTRACT

According to embodiments, the present invention comprises a method and system for managing support of quality of service requirements for various clients of a telecommunications network at a server level. Servers assigned to the various clients may include quality of service descriptors that identify relative priorities of the clients. In the event of a failure or reduced performance of a server, for example, an assignment of respective servers to respective clients may be changed based on the relative priorities of the respective clients.

11 Claims, 3 Drawing Sheets

METHOD AND SYSTEM FOR MANAGING QUALITY OF SERVICE IN A NETWORK

FIELD OF THE INVENTION

The present invention relates to managing resources in a telecommunications network, and more particularly, to a method and system for allocating server resources in a network according to client priority.

BACKGROUND OF THE INVENTION

FIG. 1 illustrates a telecommunications network 100. The network 100 could be, for example, the Internet or World Wide Web. As is well known, such a network typically includes interconnected routers and server computers (servers), such as routers 110, 120, 130, 140 and 150 and servers/data centers 155, 165, and 175. "Data center" as used herein refers to a plurality of servers collectively located at a single site or node of a network. Thus, elements 155, 165 and 175 may represent either single servers or a plurality of servers grouped into a data center.

As is further well known, client computers (clients) such as clients 101, 102 and 103 may transmit requests for services, such as e-mail, Web pages, database searches and the like, to servers, and receive data in return. Software known as TCP/IP (Transmission Control Protocol/Internet Protocol) is typically used to handle exchanges of data between clients and servers. Requests issued by clients are broken down into data packets by TCP (Transmission Control Protocol) and assigned a destination address by IP (Internet Protocol). The packets travel over the transmission media connecting the clients and servers, often by different routes, and are re-assembled by TCP at the servers.

Routers are responsible for ensuring that the packets arrive at their proper destinations. Routers typically read a data packet to obtain the destination address, calculate a route through the network for the packet, and then send the packet on toward its final destination. Data packets typically pass through at least one router on the way to their destinations, and usually pass through more than one router.

Routers and the transmission media linking them may sometimes be referred to as the "backbone" of a network. Because traffic through this backbone may sometimes be of a very high volume, it is not always possible to send a packet to its destination by an optimal (i.e., the fastest possible) route. Moreover, because the provision of Internet services and resources can be a source of substantial revenue to various commercial entities, the allocation of backbone bandwidth is an important concern. "Bandwidth" here refers generally to the speed and volume of data transmission over the backbone.

Accordingly, the concept of "quality of service" has arisen in the telecommunications industry. The concept of quality of service links the amount of money that a client of telecommunications services is willing to pay with the amount of bandwidth allocated to the client.

In known applications of the quality of service concept, the determination as to which client is to be allocated more bandwidth or less bandwidth, compared with other clients, is made at the backbone level. More particularly, a router may read a data packet to determine which client generated the packet or is to receive the packet, based on the contents of the packet. Depending upon who the client is, or more particularly, what the client pays for services, an optimal or less-than-optimal route may be assigned to the packet.

As illustrated in FIG. 1, servers are also part of the network, and therefore server performance clearly has an effect on bandwidth. However, the application of quality of service discrimination for traffic at the servers is not currently known to be practiced. Accordingly, the present invention offers a method and system for applying quality of service discrimination at the server level, thereby, as is appropriate, rewarding clients who are willing to pay more with a higher quality of service.

DETAILED DESCRIPTION

According to embodiments of the present invention, quality of service discrimination is extended to the server level. More particularly, for clients of a data center comprising a plurality of servers, a quality of service requirement for each client may be assigned at a server level, and support for the assigned quality of service requirements may be managed at a server level. This facilitates the efficient allocation of bandwidth in accordance with what a client is willing to pay for services.

Figure 1:
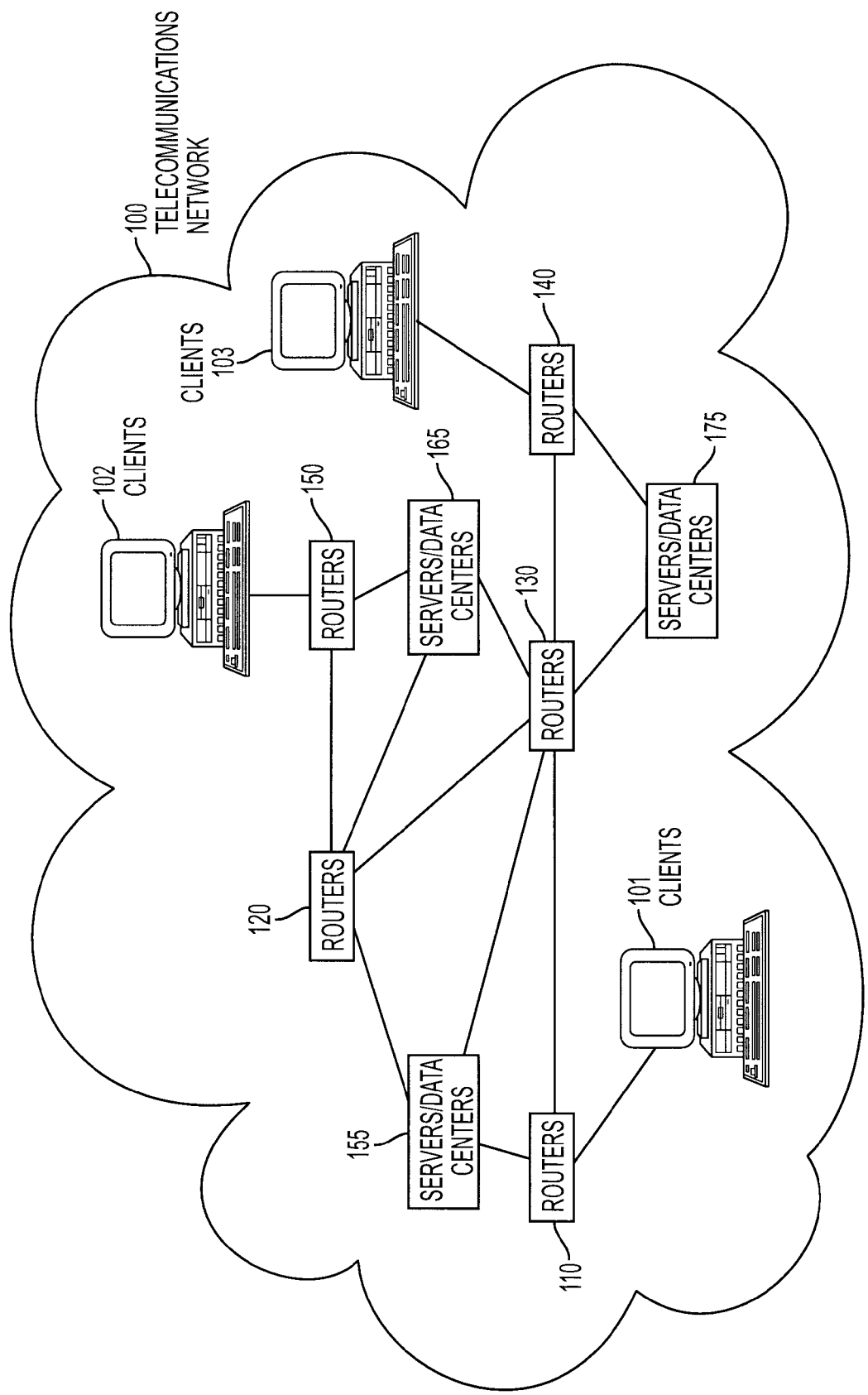
FIG. 1 is an illustration of a telecommunications network.

As described above, servers/data centers such as servers/data centers 155, 165 and 175 as shown in FIG. 1 may provide network services to clients upon request. Examples of such services include VPN (Virtual Private Networking; i.e., a system for providing private networking using the shared public infrastructure), Web hosting (i.e., providing Web pages), firewall protection (the screening of data packets to block unwanted packets), and e-mail.

For the commercial entities that provide them, certain services may generate more revenue than may others. For example, due to the resources which must be devoted to VPN and the complexity of its implementation, providers can typically charge clients more for VPN services than, say, e-mail services. Or, regardless of what type of service is being provided, a client may be willing to pay more to ensure that the quality of the service is the best possible, or at least consistently satisfactory.

In view of the foregoing, a commercial entity that is a provider of such services is naturally interested in allocating network resources in accordance with what a client is willing to pay, in order to keep higher-paying clients satisfied and therefore keep the revenue from these clients flowing.

As described above, the concept of quality of service discrimination addresses the need to profitably distribute the resources allocated to network services. However, as also described earlier, such quality of service discrimination has previously only been performed at the backbone level. Embodiments of the present invention extend quality of service discrimination to the server level, as outlined above. These embodiments are described in greater detail in the following.

Figure 2:
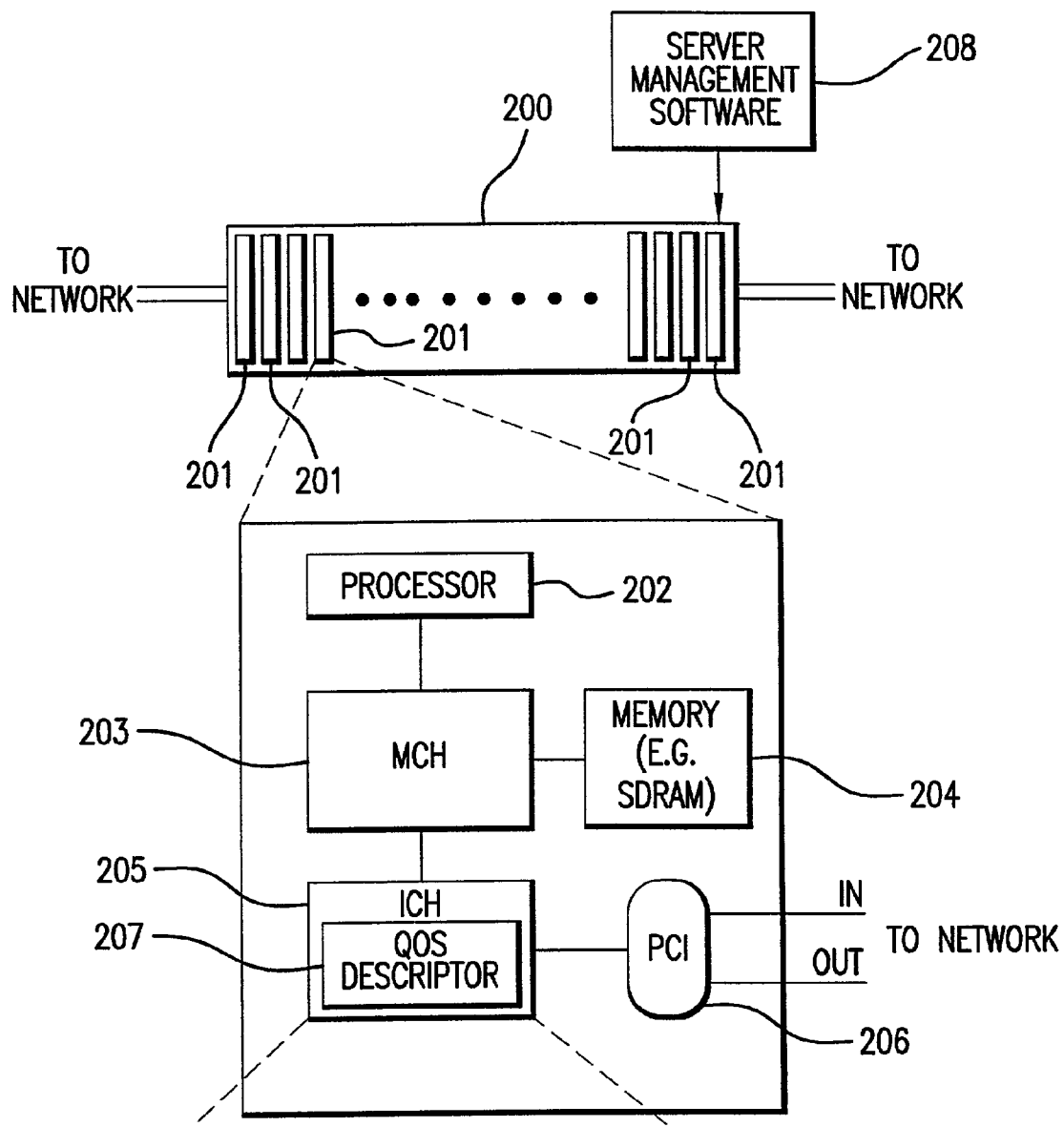
FIG. 2 shows a data center of the network, comprising a plurality of servers, and further shows detail of a server, and detail of a quality of service descriptor of a chipset of the server.

FIG. 2 illustrates at least one component 200 of a data center. The component 200 represents a chassis or "rack" for receiving servers 201. The servers 201 may also be referred to as "blades" or "blade servers." A blade server is typically a thin, modular electronic circuit board that includes one or more microprocessors and memory. A blade server can be inserted into a space-saving rack with many similar servers. A data center, thus, may comprise scores or even hundreds of blade servers, mounted in multiple racks stacked vertically in a floor-standing cabinet.

FIG. 2 further shows an enlarged view of one server 201 according to possible embodiments. The server 201 may include an integrated circuit device laid out according to the known Intel® Hub Architecture, which typically comprises at least a processor 202, a memory control hub (MCH) 203, a memory 204, and an I/O control hub (ICH) 205. The MCH 203 and ICH 205 may also be referred to, respectively, as the "North Bridge" and "South Bridge." Also, collectively the MCH 203 and ICH 205 may be referred to as a "chipset." Generally speaking, functions of the MCH 203 include, for example, acting as a main memory controller and providing an interface between the processor 202 and main memory 204. Functions of the ICH 205 include, for example, acting as an interface between main memory 204 and I/O devices, via the MCH 203. The server 201 may further include a PCI (Peripheral Component Interconnect) interface 206 containing a network interface card for connecting to the network Each server 201 may execute applications for providing services as discussed in the above examples. One or more servers 201 may execute applications for supporting VPN services, for example, while another server or servers 201 may execute applications for supporting Web hosting, or firewall, or e-mail, and so on.

According to embodiments of the invention, based on the revenue clients of these services respectively provide, each client may be assigned a quality of service requirement. The respective quality of service requirements establish a hierarchy or priority schedule of clients. For example, a first client 101 might be assigned a quality of service requirement of "0" or "platinum," indicating that this client has the highest quality of service requirement. A second client 102 might be assigned a quality of service requirement of "1" or "gold," indicating that this client has an intermediate-level quality of service requirement. A third client 103 might be assigned a quality of service requirement of "2" or "silver," indicating that this client has the lowest quality of service requirement.

Further, according to embodiments, each server 201 assigned to a client may be provided with a quality of service descriptor, configured to contain information specifying the quality of service requirement for the client to which the server is assigned. Based on the respective quality of service requirements and relative priorities of clients, the allocation of servers among client may be rearranged as described in greater detail hereinafter. As shown in FIG. 2, this quality of service descriptor 207 may be formed in the chipset of the server 201, or more particularly, in the ICH 205. In this way, as mentioned above and described in greater detail hereinafter, management of the support of quality of service requirements may be performed at the server level.

FIG. 2 further shows an enlarged view of the quality of service descriptor 207 according to possible embodiments. According to embodiments, the quality of service descriptor may be a read/write data storage area formed in the chipset. For example, the quality of service descriptor 207 may be a read/write 32-bit register formed in the ICH 205.

According to one possible format, a first field (e.g., the higher order bits 24-31) of the register could identify the client to which the server 201 is assigned. Three examples of possible clients are illustrated: Cisco® (a manufacturer of network products), NetZero® (an Internet service provider), and DARPA (Defense Advanced Research Projects Agency, a government agency). If bits 24-31 had a value of 0, for example, this could indicate that the server is assigned to client Cisco®. On the other hand, if bits 24-31 had a value of 1, this could indicate that the server is assigned to client NetZero®, and so on.

A second field (e.g., bits 16-23) of the quality of service descriptor 207 could identify a type of service to which the server 201 was dedicated. For example, if bits 16-23 had a value of 0, for example, this could indicate that the server is dedicated to supporting VPN applications. On the other hand, if bits 16-23 had a value of 1, for example, this could indicate that the server is dedicated to supporting Web hosting applications, and so on.

A third field (e.g., bits 8-15) of the quality of service descriptor 207 could identify performance parameters of the server 201. For example, bits 8-15 could identify a processor speed of the chipset included on server 201; for example, 800, 600 or 300 MHz.

Bits 0-7 of the quality of service descriptor 207 could identify the quality of service requirement for the client identified in bits 31-24. For example, if bits 0-7 had a value of 0, representing a "platinum" level of service, for example, this could indicate that the client identified in bits 31-24 has the highest quality of service requirement. On the other hand, if bits 0-7 had a value of 1, representing a "gold" level of service, this could indicate that the client identified in bits 31-24 has an intermediate-level quality of service requirement. Finally, if bits 0-7 had a value of 2, representing a "silver" level of service, this could indicate that the client identified in bits 31-24 has the lowest quality of service requirement.

To manage support of the various quality of service requirements of the various clients of a data center, according to embodiments of the invention, server management software could be provided to manage the allocation of servers among clients, based on the information in the quality of service descriptors of the respective servers assigned to the clients. As shown in FIG. 2, a selected server 201 could be utilized to execute the server management software 208.

The server management software 208 could comprise computer-executable instructions configured to maintain a database or table of the quality of service descriptors of a plurality of servers assigned to various clients. A copy of this database or table could be kept in offline storage, for example, and loaded into the memory 204 of the server 201 at boot time.

The server management software 208 could further be configured to monitor, or to communicate with other software that monitors, the performance of the servers assigned to the various clients. The performance of a server could be reduced or degraded, for example, due to hardware or software failures, causing the quality of service level of the server to fall below the quality of service requirement for its assigned client.

In such a situation, the server management software 208 could be configured to determine whether there are any "stand-by," i.e., unused servers available to replace the failing server. If not, the server management software 208 could be configured to re-allocate already-assigned servers based on client priority as reflected in the database of quality of service descriptors maintained by the server management software 208. More particularly, the server management software 208 may cause a first server 201 assigned to a first client to be re-assigned to a second client, if a second server 201 previously assigned to the second client suffers reduced performance, and if the respective quality of service descriptors of the first and second servers indicate that the second client has a higher quality of service requirement than does the first client.

For example, a first server 201 could be assigned to a first client NetZero®. The quality of service descriptor 207 for the first server could indicate that the first server 201 was providing client NetZero® with e-mail services, that the first server 201 had a 800 MHz processor, and that client NetZero® had a quality of service requirement of 2 (silver, the lowest requirement).

A second server 201 could be assigned to a second client Cisco®. The quality of service descriptor 207 for the second server could indicate that the second server 201 was providing client Cisco® with VPN services, that the server 201 had a 800 MHz processor, and that client Cisco® had a quality of service requirement of 0 (platinum, the highest requirement).

By monitoring the performance of the servers, the server management software 208 could detect that the second server 201 was experiencing reduced performance, and that therefore the quality of service requirement of client Cisco® was not being met. Accordingly, the server management software 208 could then determine that no standby servers were available, and then read its database of quality of service descriptors to search for an active server with a lower priority client than client Cisco®. In such a search, the server management software 208 could find, for example, the first server 201 assigned to client NetZero® as described above. The first server 201 would be a suitable replacement for the second server 201 because it also has a 800 MHz processor.

The server management software 208 could then cause the first server 201 to be re-assigned to the second client Cisco®. To implement this reassignment, the server management software could cause VPN software to be loaded on the first server 201, replacing the e-mail software previously loaded.

The server management software could also update the quality of service descriptor 207 of the first server 201 to reflect its new assignment, by writing the new client identifier (e.g., "0" to correspond to Cisco® and new service type identifier (e.g., "0" to correspond to VPN) to the quality of service descriptor 207 of the first server 201. The server management software could also update the entry in the database or table of quality of service descriptors corresponding to the first server 201, to reflect the new server assignment.

Figure 3:
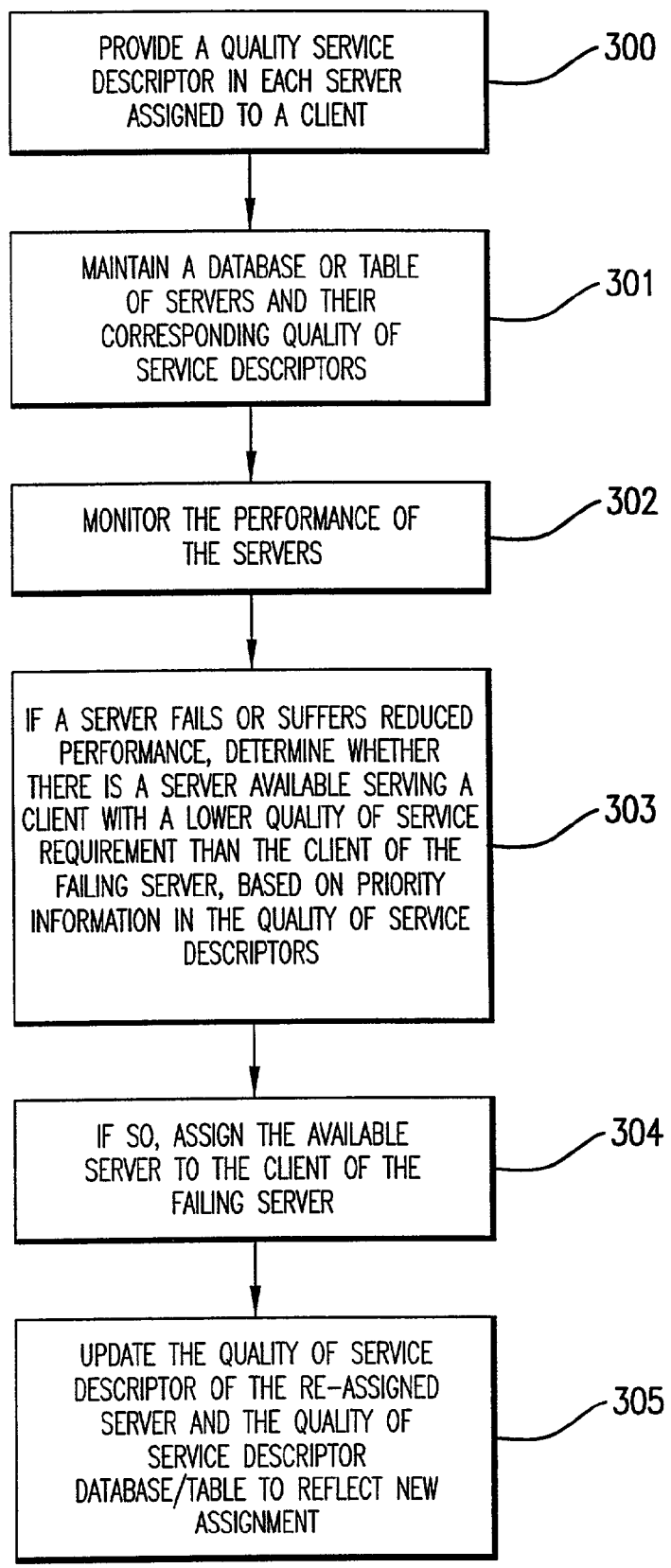
FIG. 3 shows a process flow according to embodiments of the invention.

FIG. 3 illustrates a process flow according to embodiments of the invention. As shown in block 300, each server 201 assigned to a client may be provided with a quality of service descriptor 207. As discussed above, the quality of service descriptor 207 may be formed in a chipset included in the server 201.

A database or table of servers 201 and their corresponding quality of service descriptors 207 may be established and maintained. This may be implemented, as described above, by server management software 208. The server management software 208 may load such a table into a memory 204 of a selected server 201 from offline storage at boot time, and maintain it during data center operation.

As shown in block 302, the performance of the servers 201 may be monitored, to ensure that quality of service requirements are being met. As shown in block 303, if failure or reduced performance of a server 201 is detected, it may be determined whether there is a server 201 available serving a client with a lower quality of service requirement than the client assigned the failing server 201, based on the priority information in the quality of service descriptors of the servers.

If such a server is available, the available server may be reassigned to the client of the failing server, as shown in block 304. Then, as described above, the quality of service descriptor of the re-assigned server and quality of service descriptor database/table may be updated the reflect the new assignment, as shown in block 305.

It may be appreciated in view of the foregoing description that embodiments of the present invention provide a method and system for managing support of quality of service requirements for various clients of a telecommunications network at a server level. In this way, quality of service discrimination is extended from the network backbone and into the servers/data centers of the network, thereby more efficiently and profitably allocating network resources and rewarding those clients who are willing to pay more for a higher quality of service.

It will further be recognized that computer-executable instructions according to embodiments of the present invention, for example server management software 208, may be stored and transported on a computer-usable medium such as diskette, magnetic tape, disk or CD-ROM. The instructions may be downloaded to another storage medium such as a memory 204 of a server 201, from which they may be fetched and executed by a processor 202 to effect the advantageous features of the invention.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method comprising:

for a client of a data center of a telecommunications network, assigning a quality of service requirement at a server level by providing a quality of service descriptor in each of a plurality of blade servers of said data center, said quality of service descriptor including a register located within an integrated circuit chipset included within each blade server, said register including a first field identifying a client assigned to the blade server, a second field identifying a type of service to which the blade server is dedicated, a third field identifying at least one performance parameter for the blade server, and a fourth field identifying at least one respective quality of service requirement for the client assigned to the blade server; and managing support of said quality of service requirement at said server level by monitoring a performance of each of said blade servers and in the event of a reduced performance of at least one of said blade servers, changing an assignment of said blade servers to respective clients based on information in respective quality of service descriptors of said blade servers by re-assigning a blade server assigned to a first client with a first quality of service requirement to a second client with a second quality of service requirement, wherein said second quality of service requirement is higher than said first quality of service requirement.

2. The method of claim 1, wherein monitoring said performance comprises: maintaining a database of said quality of service descriptors of said blade servers.

3. A blade server for a telecommunications network, said blade server comprising a quality of service descriptor, said quality of service descriptor including a register located within an integrated circuit chipset included within said blade server, said register including a first field identifying a client assigned to the blade server, a second field identifying a type of service to which the blade server is dedicated, a third field identifying at least one performance parameter for the blade server, and a fourth field identifying at least one respective quality of service requirement for the client assigned to the blade server, and in the event of a reduced performance of said blade server, changing an assignment of said blade server to respective client based on information in respective quality of service descriptor of said blade server by re-assigning a blade server assigned to a first client with a first quality of service requirement to a second client with a second quality of service requirement, wherein said second quality of service requirement is higher than said first quality of service requirement.

4. The blade server of claim 3, wherein said register is a 32-bit register.

5. The blade server of claim 3, wherein said quality of service descriptor is writable to assign said blade server to a different client.

6. A data center in a telecommunications network, said data center comprising a plurality of blade servers, each blade server including a quality of service descriptor including a register located within an integrated circuit chipset included within each blade server, said register including a first field identifying a client assigned to the blade server, a second field identifying a type of service to which the blade server is dedicated, a third field identifying at least one performance parameter for the blade server, and a fourth field identifying at least one respective quality of service requirement for the client assigned to the blade server, and in the event of a reduced performance of at least one of said blade servers, changing an assignment of said blade servers to respective clients based on information in respective quality of service descriptors of said blade servers by re-assigning a blade server assigned to a first client with a first quality of service requirement to a second client with a second quality of service requirement, wherein said second quality of service requirement is higher than said first quality of service requirement.

7. The data center of claim 6, further comprising executable program code to manage the allocation of said plurality of blade servers among clients, based on information included in said quality of service descriptor.

8. A machine-readable storage medium embodying computer-executable instructions, which when executed implement a process comprising:

maintaining client priority information for a plurality of clients of a data center of a network service, each of said clients being assigned at least one blade server;

providing a quality of service descriptor including a register located within an integrated circuit chipset included within each of a plurality of blade servers of said data center, said register including a first field identifying a client assigned to the blade server, a second field identifying a type of service to which the blade server is dedicated, a third field identifying at least one performance parameter for the blade server, and a fourth field identifying at least one respective quality of service requirement for the client assigned to the blade server;

monitoring a performance of each of said blade servers; and in the event of a reduced performance of at least one of said blade servers, re-assigning clients to different blade servers based on information in respective quality of service descriptors of said blade servers by re-assigning a blade server assigned to a first client with a first quality of service requirement to a second client with a second quality of service requirement, wherein said second quality of service requirement is higher than said first quality of service requirement.

9. The machine-readable medium of claim 8, further comprising updating said quality of service descriptor of a re-assigned blade server, said quality of service descriptor specifying a priority level of a client assigned said re-assigned blade server.

10. A system comprising:

a plurality of blade servers each having an interface to a network and a quality of service descriptor, the quality of service descriptor including a register located within an integrated circuit chipset included within each of the plurality of blade servers, each register including a first field identifying a client assigned to the blade server, a second field identifying a type of service to which the blade server is dedicated, a third field identifying at least one performance parameter for the blade server, and a fourth field identifying at least one respective quality of service requirement for the client assigned to the blade server; and a managing server comprising:

computer-executable instructions stored in a memory; and a processor coupled to said memory to execute said instructions; wherein said instructions are configured to:

maintain client priority information for a plurality of clients of said plurality of blade servers based on priority information in said quality of service descriptors;

monitor a performance of each said blade servers; and in the event of a reduced performance of at least one of said blade servers, perform a reassignment of clients to different blade servers based on said priority information in said quality of service descriptors of said blade servers by re-assigning a first blade server assigned to a first client to a second client assigned a second blade server, when the quality of service descriptor of said second blade server indicates that said second client has a higher priority than said first client.

11. The system of claim 10, wherein to perform said reassignment, said instructions are further configured to update the quality of service descriptor of a re-assigned blade server, said quality of service descriptor specifying a priority level of a client assigned said re-assigned blade server.

* * * * *